United States Patent Office 3,542,604
Patented Nov. 24, 1970

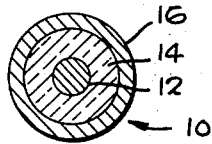
Fig. 1
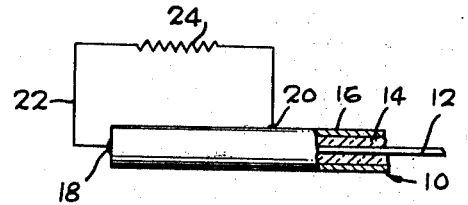
Fig. 2
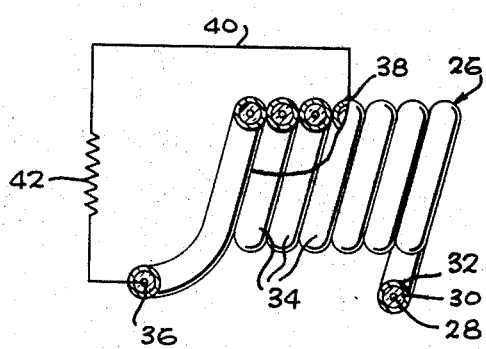
Fig. 3
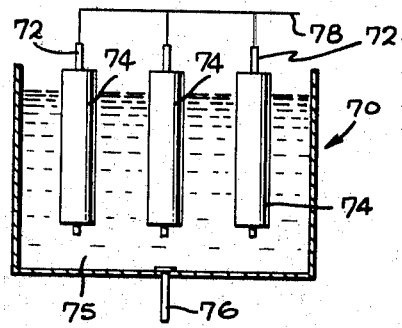
Fig. 5
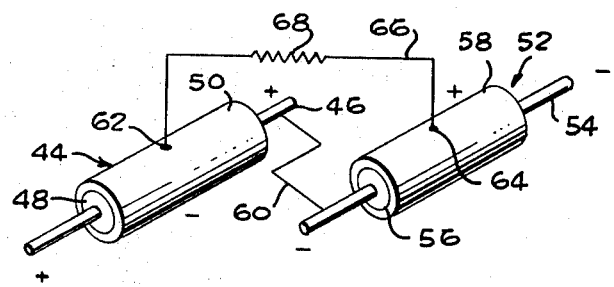
Fig. 4
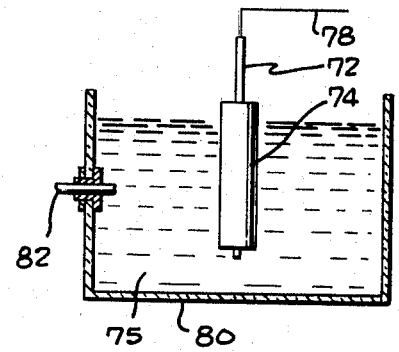
Fig. 6
Fig. 7
FRANK C. ARRANCE
CARL BERGER
INVENTORS

3,542,604
THERMAL BATTERY
Frank C. Arrance, Costa Mesa, and Carl Berger, Santa Ana, Calif., assignors, by mesne assignments, to McDonnell Douglas Corporation, Santa Monica, Calif., a corporation of Maryland
Filed Feb. 24, 1965, Ser. No. 434,971
Int. Cl. H01c 7/04; H01b 1/06; H01v 3/00
U.S. Cl. 136—205
1 Claim

ABSTRACT OF THE DISCLOSURE

Thermal battery comprising according to one embodiment, a wire, ribbon or strip, formed of a metal such as iron or aluminum, a glass or enamel coating containing a lithium-bearing substance such as lithium carbonate, over the wire, ribbon or strip, and a coating of a conductive metal over the glass or enamel coating, the last mentioned metal being different from the metal of such wire, ribbon or strip, e.g., silver, such thermal battery having small weight and volume and high capacity and high power output.

---

This invention relates to thermal batteries, and is particularly concerned with batteries which are inactive at ambient temperature, and which become active at elevated temperature and particularly high temperatures of the order of about 400° C. and above.

Thermal batteries which are inactive at ambient temperature up to from about 100 to about 200° C. or higher, but which become active at said elevated temperatures, are of value for application in devices where high temperatures are encountered, e.g., in airborne applications. Since weight and volume are important considerations in such applications, small, lightweight, compact, high energy power sources which are operative at such elevated temperatures are of particular interest.

It is accordingly one object of this invention to provide a thermal battery inactive at ambient temperature and up to about 200° C. or higher, but which is active at such elevated temperature and which will operate particularly at temperatures in the range of about 200 to about 1200° C. in air or other atmospheres.

Another object of the invention is the provision of a battery affording a small, lightweight, compact high energy power source, and which is inactive at ambient temperatures up to an elevated temperature in excess of about 100° C., e.g., up to about 200 to about 400° C., but is operative at such elevated temperatures.

Still another object is to provide primary batteries having the above noted characteristics which are designed to operate for long periods, e.g., months, at high temperatures in the range of about 200 to about 1200° C.

A still further object of the invention is to provide secondary batteries operable at elevated temperatures in excess of 100° C., e.g., in the range of about 200 to about 1200° C., and which are operative over a large number of charge-discharge cycles.

Other objects and advantages of the invention will appear herinafter.

According to the invention, the above noted objects are achieved and a thermal battery is provided which basically comprises elongate metal means, e.g., in the form of a meal wire, a vitreous, e.g., glass, coating on said elongate means or wire, such vitreous coating including a substance forming a mobile metal ion in such vitreous coating when said coating is heated to elevated temperature, an envelope for such vitreous coating, and a conductive metal means associated with such envelope and in electrical contact with said vitreous coating at said elevated temprature, the metal of said last mentioned conductive metal means being different from the metal of said elongate means. Such envelope for the vitreous coating and the conductive metal asociated with such envelope, can be in the form of a coating of a conductive metal on the vitreous coating.

Thus, according to one embodiment of the invention a thermal battery can be provided in the form of a wire, ribbon, rod or strip, formed of a metal such as iron or aluminum. A glass or enamel coating, preferably containing a lithium-bearing substance, is applied to the wire, ribbon, rod or strip, and a metal coating, e.g., iron or silver, and of a metal different from the metal of the wire or equivalent elongate means, is applied over the glass coating. In this battery unit the elongate means, e.g., the wire, and the conductive metal coating over the glass coating serve as electrodes. Preferably, the vitreous coating, e.g., the preferred lithium-bearing glass coating, has a coefficient of expansion which is substantially the same as the coefficient of expansion of the applied metal coating, to assure maximum contact of the outer metal coating with the glass ocating at all times. As the temperature is increased, the vitreous or glass coating between the internal wire and the outer metal coating, and containing a substance forming a mobile metal ion at elevated temperatures, e.g., a lithium ion, functions more as an electrolyte and less as a dielectric, providing an E.M.F. across the inner wire and the outer conductive metal coating electrodes, so that the unit functions as a battery.

A unit of the type described above is illustrated in FIGS. 1 and 2 of the drawing accompanying this application. Numeral 10 indicates a battery according to this modification, comprising an interior elongate means, e.g., metal wire 12, having a vitreous, e.g., glass or enamel, coating 14 containing for example, a lithium-bearing substance, and a conductive metal coating 16 over the vitreous or glass coating 14. As seen in FIG. 2, the elongate means or wire 12 is electrically connected to the external metal coating 16 at terminals 18 and 20, via an electrical circuit 22 including a resistance or load 24.

At ambient temperature, and up to about 200° C., the embodiment described above and illustrated in FIGS. 1 and 2, is substantially inactive as a battery. As the temperature approaches 200° C. and at temperature above 200° C., lithium ions become more mobile and move with a substantial degree of freedom through the glass coating 14. The positively charged lithium ions migrate toward the cathode, which, in the embodiment shown in FIGS. 1 and 2, can be the metal, e.g., silver, coating 16, and providing a potential across terminals 18 and 20 on the anode and cathode, and a flow of current in the external circuit 22. Hence, the lithium ion in the glass functions as a current carrier through the vitreous or glass coating 14.

It will be understood that the battery described above and illustrated in FIGS. 1 and 2 will be operative to some extent at temperatures below about 200° C. Thus, as the temperature is increased, e.g., from between about 100 to about 200° C., the resistivity of the glass decreases, due to increased mobility of some of the lithium ions which are present. This mobility, however, is substantially increased as, in the above noted embodiment, the temperature approaches about 200° C. and continues to increase at temperatures above 200° C., e.g., of the order of 400 to 500° C. and above. At temperatures, e.g., of the order of about 900° C. where the glass is in such molten or fluid state that it will actually commence to sag or drip, this would be the upper temperature limit of practicability for the embodiment of FIGS. 1 and 2, since it is desirable to operate this embodiment at temperatures where such softening or dripping of the glass or vitreous coating does not occur. As the temperature is raised, e.g., as the temperature is increased above 200° C., and a gradual decrease in glass resistivity occurs, the current output of the battery, e.g., as illustrated in FIGS. 1 and 2, increases.

It will be understood, e.g., in the embodiment of FIGS. 1 and 2, that the elongate means, e.g., the wire 12, can be the anode or the cathode, and the conductive metal coating 16 can be the cathode or the anode. The cathode or oxygen electrode is usually composed of a metal which is relatively low in the electromotive series. The electrode metals should be chosen from among those metals whose melting temperatures are above the desired operating temperatures of the battery. Thus, for example, electrode metals can be employed in the invention battery, which include relatively low melting metals such as sodium having a temperature just below 100° C., to very high melting metals such as tungsten having a melting temperature of the order of about 3400° C. Suitable anode metals include, for example, iron, aluminum, magnesium, calcium, barium, zinc, cadmium, lead, nickel, maganese, lithium and sodium. The cathode metals which, as previously noted, are usually lower in the electromotive series than the anode metals, can include iron, silver, tungsten, molybdenum, nickel, calcium and magnesium.

Certain preferred electrode combinations include for example, aluminum as anode and silver as cathode, iron as anode and silver as cathode.

The vitreous coating, e.g., glass or enamel coating on the elongate metal means, e.g., wire 12 of FIG. 1, can be a conventional form of glass or can be other types of glass. Thus, for example, such glasses can be sodium or potassium glasses, that is, containing sodium or potassium silicates, or borosilicate glasses. Examples of specific glass compositions which can be used are as follows:

Regular glass:     Composition A, perecnt by wt.
    Sand _____ 50.0
    Soda ash _____ 20.0
    Lime _____ 20.0
    Lithium carbonate _____ 10.0
Borosilicate glass:     Composition B, percent by wt.
    Sand _____ 40.0
    Soda ash _____ 20.0
    Lime _____ 20.0
    Boric acid _____ 10.0
    Lithium carbonate _____ 10.0

The above glass compositions A and B are understood to be simply illustrative of the types of glass coatings which can be applied over the elongate metal means, e.g., wire, forming an electrode of the battery.

Although for example, conventional glass or borosilicate glass contains metal bearing substances such as lime, and such glasses containing such metallic constituent, e.g., calcium, function to some extent as an electrolyte as the temperature is increased, as a feature of the invention and in preferred practice as previously noted, there is included in the vitreous, e.g., glass coating, a substance which when the vitreous or glass coating is heated at elevated temperatures, furnishes a highly mobile metal ion in the vitreous or glass medium. When the battery unit is heated at elevated temperatures, e.g., of the order of about 200° C. or above, such mobile metal ions move much more rapidly through the glass or vitreous coating then the other metallic constituents ordinarily present therein and including, for example, calcium, and also aid to prevent polarization at the interface between the glass coating and the adjacent wire and metal coatings.

The mobile metal ion-containing substance preferably incorporated in the vitreous or glass coating according to the invention, is preferably a substance containing a metal selected from the group consisting of lithium, sodium and potassium, with lithium being particularly desirable. These metals can be incorporated into the vitreous or glass coating in the form, for example, of suitable compounds of such metals, e.g., lithium carbonate, sodium carbonate, potassium carbonate, lithium aluminosilicate, minerals such as lepidolite and amblygonite, and the like. Also, if desired, these metals can be incorporated into the glass as elemental sodium, potassium or lithium. As temperature is increased, e.g., at temperatures of the order of about 200° C. or above, the vitreous or glassy vehicle allows the lithium ions to migrate to the cathode more readily.

Preferably, the viteous, that is enamel or glass coating, as at 14 in FIG. 1, contains a minor amount of the above noted mobile metal ion-containing substance, e.g., lithium carbonate and/or sodium carbonate. Thus, for example, such substance can be present in the vitreous or glass coating in an amount of about 0.5% to about 20%, preferably about 0.5% to about 10%, by weight of the vitreous coating, based on elemental lithium, sodium or potassium.

It will be noted that the lithium, in addition to being employed as the mobile ion in the vitreous or glass coating, can also at the same time be employed as an anode metal. Longer battery life and steady state operability of the battery is thus provided since additional lithium ion is thus furnished to the glass from the lithium anode. At the same time the physical and chemical properties of the glass will remain substantially invariant.

The wire or tubular configuration form of thermal battery, according to the invention, as illustrated at 10 in FIGS. 1 and 2, has the advantage of providing a much greater surface area of electrodes per unit of volume. This feature permits the production of batteries of high capacity and high output in a small package.

Another modification or configuration of the battery concept of the invention is illustrated in FIG. 3 of the accompanying drawing. Such battery is again in tubular or cylindrical form similar to the tubular battery 10 and comprising a wire, tape, ribbon or strip 28, an enamel or glass coating 30 and an outer metal coating 32. The coated wire unit is coiled to form a plurality of helical coils 34 with the outer metal coating 32 of adjacent coils preferably in contact with each other, and providing high conductivity for the current through the outer metal coating. With a terminal 36 connected to the inner wire 28 and a terminal 38 connected to the outer metal coating 32 of one of the coils 34, and a circuit 40 connected to such terminals and including a load or resistance 42, a coiled wire battery is provided which can function either as a high rate or as a low rate battery. Thus, by increasing the number of coils or the diameter of the interior wire 28, the rate of the battery is increased, and conversely a low rate battery is provided by decreasing the number of turns or coils and/or by reducing the diameter of the internal wire 28. A high rate battery is one which has a high rate of discharge over a relatively short period of time and a low rate battery is one which delivers low rates of current over a relatively long time period.

For producing a coiled wire battery of the type illustrated at 26 in FIG. 3, an enameled or glass coated wire, ribbon or the like is coiled or spooled as indicated in FIG. 3, providing large electrode areas in a small space. The metal wire 28 can be enameled by application thereto of a lithium-bearing glass by dipping, spraying, or the like, and the resulting coating fired to form the coating of glass 30, such glass containing the mobile metal ion-containing substance a sabove described. Before or after firing, the outer metal coating 32 can be applied by roller coating, spraying, dipping and the like. This outer coating can be fired either simultaneously with the firing of the glass or separately. Firing can take place in air or hydrogen or other suitable atmosphere, depending upon the metals or materials used. As previously noted, in the coiled wire embodiment of FIG. 3, the outer metalized surfaces of the respective coils 34 have electrical contact with each other. A terminal 36 at the outer end of wire 28 and a terminal 38 on the outer metal surface 32 of one of the coils 34, are electrically connected in a circuit indicated at 40, including a resistance or load 42.

To obtain higher voltage, cells or batteries of a type generally illustrated in FIGS. 1 and 2 can be connected in series, or the systems can be reversed so as to connect anode to cathode, e.g., as illustrated in FIG. 4 of the accompanying drawing.

Thus, for example, referring to FIG. 4, the cell 44 in cylindrical form is composed of an inner wire or rod anode 46 composed of iron, an intermediate layer or coating 48 of a lithium-bearing glass, and an external coating 50 over the intermediate glass, said coating 50 being a relatively thin silver coating and forming the cathode. Cell 52 is also of cylindrical form and is composed of a silver wire 54 forming the cathode, an intermediate lithium-bearing glass coating 56 and an outer coating 58 of iron forming the anode of the cell 52. In this system the iron wire anode of cell 48 is electrically connected by the wire 60 to the silver wire cathode of the cell 52. Terminals 62 and 64 on the outer silver cathode coating on the cell 48, and on the outer iron anode coating on the cell 52, are connected in an external circuit 66 containing a load or resistance 68.

The battery of FIG. 4 formed by the cell units 48 and 52 connected in series, has a substantially higher potential drop across the terminals 62 and 64 than in the case of the single unit illustrated in FIGS. 1 and 2, and produces a substantially higher output.

According to a further embodiment of the invention, glass or enamel coated metal wires are placed in an anode material contained in a suitable vessel. In the embodiment of the invention illustrated in FIGS. 1 to 4 and described above, during operation of these cells at elevated temperature, the mobile metal ion, e.g., the lithium ion, in the enamel or glass migrates to the cathode causing a gradual depletion of such ion in the glass. This depletion of the mobile, e.g., lithium, ion in the glass causes polarization and gradually reduces the output of the battery. The solution of heavy metal ions such as the $Fe^{++}$ ion from an iron anode, is ineffective in providing the rapid ionic transport which is required, and further such heavy metal ions cannot be properly transported through the glass due to its physical and chemical properties. This problem is alleviated in the modification of FIG. 5 by the provision of a reservoir of mobile ion-containing substance in the form, for example, of a compound of lithium, sodium or potassium, such as sodium, potassium or lithium chloride, or the elemental metals, e.g., lithium, sodium or potassium, which at the high temperatures of operation of the battery, provide the corresponding mobile metal ions, e.g., lithium ions, to the glass electrolyte, as lithium ions become depleted therefrom due to migration to the cathode.

Referring to FIG. 5, numeral 70 represents a container or a vessel which can be constructed of an anode material as described above, such as iron. A plurality of wires of a metal formed from a cathode type metal as described above, e.g., silver, indicated at 72, are each coated with a glass or enamel coating 74 containing a mobile ion-containing substance such as lithium-containing substance, and are placed or immersed in spaced relation in an anode material, indicated at 75, preferably lithium, contained in the vessel 70. The anode terminal 76 is connected to the outer wall of the vessel and the respective wires 72 coated with the lithium-containing glass electrolyte 74, are electrically connected in parallel to a cathode terminal wire 78.

As in the case of the embodiments of FIGS. 1 to 4, at low temperatures below the fusion temperature of the body of lithium-containing substance, e.g., lithium, in the container 70, disposed between the anode, the container wall, and the glass coated cathode wires 72, the battery of FIG. 5 remains inoperative due to complete lack of transport at such low temperatures of lithium ions from the iron anode or container wall, to the glass coating 74 over the cathode wires 72. Where, for example, the body of anode material 75 is elemental lithium, when the temperature reaches approximately 185° C., the melting point of lithium, the molten lithium thus produced provides ionic transport between the anode formed by the container wall 70 and the cathode glass coated wires 72, and of particular significance, as lithium ion present in the glass coatings 74 migrate to the cathode wires 72 and thus become depleted in the glass, the body of molten lithium 75 continuously furnishes lithium ions to the glass, preventing polarization of the cell and affording a much more concentrated supply of lithium ions than in the embodiment of FIGS. 1 to 4 noted above. A battery of the type shown in FIG. 5 exhibits excellent electrical characteristics, with an open circuit potential of the order of about 2.7 volts and having high capacity. At high temperatures of the order of about 400 to about 1200° C. little polarization of such battery takes place, heat transfer is good and also, because of the low equivalent weight of lithium, a low weight battery can be provided, the body of lithium 75 or the so-called lithium anode, providing a constant high concentration and a steady state of the lithium ions in the glass.

As described previously, other mobile ions and glasses can be employed in the battery illustrated in FIG. 5. Also, although three sets of wires 72 are shown in the embodiment of FIG. 5 it will be understood that only one or any desired number of glass coated wires 72 can be employed.

However, it will be noted that the modification of FIG. 5 is basically similar to the embodiment of FIGS. 1 to 4 except that in the embodiment of FIG. 5 the molten lithium bath 75 provides the electrical contact between the anode forming the wall of the container and the mobile ion-containing glass coating 74 of the cathode wires 72.

The embodiment of FIG. 5 can further be modified, as illustrated in FIG. 6, by constructing the container 80 of a non-conductive inorganic, e.g., ceramic material, with a conductive, e.g., iron, anode probe 82 mounted on the container wall and extending into the interior of the container. Also, if desired, and as illustrated in FIG. 7, a container 84 can be employed having its exterior 86 formed of a non-conductive, e.g., ceramic material, with the interior lining 88 of the container 70 composed of an anode metal such as iron, and a terminal 90 connected to such interior lining and extending exteriorly of the vessel for connection in a circuit. In FIGS. 6 and 7, a single electrode formed of a wire 72 coated with a lithium-containing vitreous or glass electrolyte 74 is shown.

Although the batteries described above and illustrated in FIGS. 1 to 7 can be employed principally as primary batteries, with a battery of the type illustrated in FIGS. 5 to 7 having particularly long life, these batteries can also be employed as secondary batteries which can be charged and discharged over a large number of charge-discharge cycles.

In the embodiments illustrated in FIGS. 1 to 4 above, the mobile ion-containing vitreous or glass electrolyte, as previously noted, permits the battery to operate at temperatures somewhat below the actual fusion temperature of lithium, since as the glass is heated and is still at temperatures below 200° C., the glass permits some ion transport. However, in the case of the battery of FIG. 5 this battery will not operate until the anode bath 75, e.g., the body of lithium therein, fuses at temperature approaching 200° C. and permits ionic transport from anode to cathode. However, in the case of all of the batteries of FIGS. 1 to 7, such batteries operate most efficiently at elevated temperatures of the order of about 400° C. and above.

The following are examples of batteries produced according to the invention, and results obtained therewith.

EXAMPLE 1

A coiled wire battery is provided of the type illustrated in FIG. 3 above, composed of an iron wire coated with a lithium-containing glass of composition A above, with a thin silver coating over the glass coating.

Such battery operates as a high rate battery at 1 volt potential and at a current density of 310 to 775 ma./cm.$^2$ and a temperature of 500° C.

EXAMPLE 2

A coiled wire battery of the type shown in FIG. 3 above is provided, wherein the wire anode is aluminum and the glass is a lead borosilicate glass containing 7% lithium, and the outer metal coating is a thin silver cathode coating.

This battery also operates as a high rate battery at 2.4 to 2.6 volts at 500° C.

EXAMPLE 3

A coiled wire battery similar to that illustrated in FIG. 3 is provided, composed of a nickel wire anode, a coating of a lead glass containing 5% lithium, and a calcium cathode coating over the glass electrolyte coating. In this case, a low rate battery is provided which at a potential of 1 volt provides a current density of 0.3 to 0.5 ma./cm.$^2$ at 500° C.

EXAMPLE 4

A coiled wire battery of the type shown in FIG. 3 is provided, wherein the wire anode is iron and the glass is a lead borosilicate glass containing 8% lithium, and the outer metal coating is a thin silver cathode coating. This battery operates at about 1 volt at 500° C. and is capable of relatively high discharge rates of about 10 to about 20 ma./cm.$^2$.

EXAMPLE 5

A battery of the type shown in FIG. 4 is provided, composed of two parts. The first part is in the form of a cylinder wherein the internal wire is an iron anode, the glass coating is a lead glass containing 5% lithium, and the outer metal coating is a thin silver cathode coating. The second part of the battery is made of a silver cathode wire coated with the same glass and the outer metal coating is a thin iron anode coating. These two parts are electrically connected as shown in FIG. 4 so that the positive pole of one part is connected to the negative pole of the other part, and vice versa, through an external circuit, providing a series connected battery. When connected to a load, as indicated in FIG. 4, this battery is capable of providing about 2 volts at 600° C. and a current density of about 5 to about 20 ma./cm.$^2$.

From the foregoing, it is seen that novel thermal batteries of small weight and volume and of high capacity and high power output are provided according to the invention and which operate at temperatures ranging from as low as about 100° C. to about 200° C., up to about 1200° C., based essentially on a wire configuration which forms one electrode of the battery, a vitreous or glass coating containing a substance providing a mobile ion, which functions as an electrolyte at high temperatures, and a conductive metal associated with such glass coating, e.g., as a coating of a conductive metal over the glass coating, or as a conductive metal in electrical contact at elevated temperatures with the glass electrolyte, through a body of a molten anode material such as lithium.

While we have described particular embodiments of our invention for purposes of illustration, it will be understood that the invention is not to be taken as limited except by the scope of the appended claim.

We claim:

1. An electrical circuit comprising at least one thermal battery, as the sole source of EMF in said circuit, having first and second terminal means and a load electrically connected to said thermal battery through said first and second terminal means, said load being driven by the electromotive force of said thermal battery at elevated temperature, said thermal battery comprising a wire of a metal selected from the group consisting of iron, aluminum, and silver, said wire being provided with said first terminal means in electrically conductive attachment thereto, a glass coating on said wire containing a lithium-bearing substance forming lithium ions at elevated temperature, and a conductive metal coating surrounding said glass coating of a metal selected from the group consisting of iron, aluminum, and silver, so that when said wire is iron or aluminum, said conductive metal coating is silver, and when said wire is silver, said conductive metal coating is selected from iron and aluminum, and said conductive metal coating being provided in electrically conductive attachment, with said second terminal means.

References Cited

UNITED STATES PATENTS

| | | | |
|---|---|---|---|
| 2,805,272 | 9/1957 | Postal | 136—228 |
| 2,847,643 | 8/1958 | De Boisblanc | 136—228 X |
| 2,941,192 | 6/1960 | Postal | 136—228 X |
| 3,298,872 | 1/1967 | Baak | 136—205 |
| 2,976,505 | 3/1961 | Ichikawa | 252—518 X |
| 3,057,940 | 10/1962 | Fritts | 136—233 |
| 3,306,833 | 2/1967 | O'Leary. | |

FOREIGN PATENTS

| | | |
|---|---|---|
| 859,738 | 1/1961 | Great Britain. |
| 161,218 | 2/1955 | Australia. |
| 800,550 | 8/1958 | Great Britain. |

ALLEN B. CURTIS, Primary Examiner

U.S. Cl. X.R.

136—228; 252—508; 338—22; 340—228